(12) United States Patent
Karstens

(10) Patent No.: US 8,055,887 B2
(45) Date of Patent: Nov. 8, 2011

(54) DYNAMICALLY UPDATING BARCODE DATA

(75) Inventor: Christopher Kent Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 12/044,512

(22) Filed: Mar. 7, 2008

(65) Prior Publication Data

US 2009/0228694 A1 Sep. 10, 2009

(51) Int. Cl.
- *G06F 9/00* (2006.01)
- *G06F 9/312* (2006.01)
- *G06F 15/177* (2006.01)
- *G06K 1/00* (2006.01)

(52) U.S. Cl. ............... 713/1; 713/2; 713/100; 709/220; 235/462.01

(58) Field of Classification Search ............... 713/1, 2, 713/100; 709/220; 235/462.01
See application file for complete search history.

(56) References Cited

U.S. PATENT DOCUMENTS

| | | | |
|---|---|---|---|
| 7,062,455 B1 | 6/2006 | Tobey | |
| 7,537,162 B1 * | 5/2009 | Siu | 235/462.01 |
| 2005/0010749 A1 * | 1/2005 | Zomaya et al. | 713/100 |
| 2005/0165653 A1 * | 7/2005 | Meaney et al. | 705/26 |
| 2006/0064542 A1 | 3/2006 | Goodman et al. | |
| 2006/0097041 A1 * | 5/2006 | Funamoto et al. | 235/380 |
| 2007/0027981 A1 | 2/2007 | Coglitore et al. | |
| 2007/0045421 A1 | 3/2007 | Liu | |
| 2007/0130376 A1 * | 6/2007 | Moon | 710/8 |
| 2007/0291318 A1 * | 12/2007 | Wang et al. | 358/3.28 |
| 2008/0086499 A1 * | 4/2008 | Wefers et al. | 707/102 |
| 2008/0250122 A1 * | 10/2008 | Zsigmond et al. | 709/220 |

* cited by examiner

*Primary Examiner* — Thomas Lee
*Assistant Examiner* — Fahmida Rahman
(74) *Attorney, Agent, or Firm* — Yee & Associates, P.C.; Steven L. Bennett

(57) ABSTRACT

A system for generating a barcode. In response to receiving registration data from at least one component in a data processing system to determine a current component configuration of the data processing system, the current component configuration of the data processing system is compared with a last stored component configuration for the data processing system. Then, it is determined whether the current component configuration of the data processing system matches the last stored component configuration for the data processing system. In response to determining that the current component configuration of the data processing system does not match the last stored component configuration for the data processing system, a barcode is generated that reflects the current component configuration of the data processing system. Then, the barcode that reflects the current component configuration of the data processing system is stored in a storage device.

20 Claims, 3 Drawing Sheets

DYNAMICALLY UPDATING BARCODE DATA

BACKGROUND OF THE INVENTION

1. Field of the Invention

The present invention relates generally to an improved data processing system and more specifically to a computer implemented method, system, and computer usable program code for dynamically updating barcode data that reflects a current component configuration of the data processing system when the configuration of the data processing system changes.

2. Description of the Related Art

Today, physical inventory of computers and other types of electronic equipment is typically limited to finding a serial number on the outside of an enclosure for the electronic device. In general, enclosures for these electronic devices cost a fraction of the components that make up the "heart" of these electronic devices. For example, an enclosure for an electronic device may only cost $40.00, whereas components inside the enclosure, such as central processing units (CPUs), memory devices, and hard disk drives, may cost thousands of dollars. So ultimately, manufacturers, value add business partners, and end customers alike may want to physically inventory the expensive components inside the enclosure. However, manufacturers, value add business partners, and end customers may not be able to afford the cost, time, and inconvenience of taking the electronic devices apart to physically inventory the expensive components inside the enclosure.

For example, a value add business partner for a manufacturer may remove a smaller hard disk drive and install a larger hard disk drive in 100 blade servers before sending the blade servers to an end customer. A quality control person at the value add business may want to validate that the work of removing and installing the hard disk drives in the 100 blade servers has been performed correctly, but does not have the time or resources to take each blade server apart for verification purposes. In a complex blade server configuration, taking a blade server apart and then reconnecting it may introduce problems, such as, for example, bent pins between layers of components within the blade. Typically, once blade servers are assembled and tested, value add business partners do not want to disassemble the blade servers because the blade servers will have to go back through the testing process, among other things. Similarly, when the end customer receives shipment of the 100 blade servers from the value add business partner, the end customer may want an easy, quick way to verify that the hardware and software components in the blade servers have been correctly built-to-order before putting the blade servers into service within a data center.

BRIEF SUMMARY OF THE INVENTION

According to one embodiment of the present invention, a barcode is dynamically generated. In response to receiving registration data from at least one component in a data processing system to determine a current component configuration of the data processing system, the current component configuration of the data processing system is compared with a last stored component configuration for the data processing system. Then, it is determined whether the current component configuration of the data processing system matches the last stored component configuration for the data processing system. In response to determining that the current component configuration of the data processing system does not match the last stored component configuration for the data processing system, a barcode is generated that reflects the current component configuration of the data processing system. Then, the barcode that reflects the current component configuration of the data processing system is stored in a storage device.

DETAILED DESCRIPTION OF THE INVENTION

Figure 1:
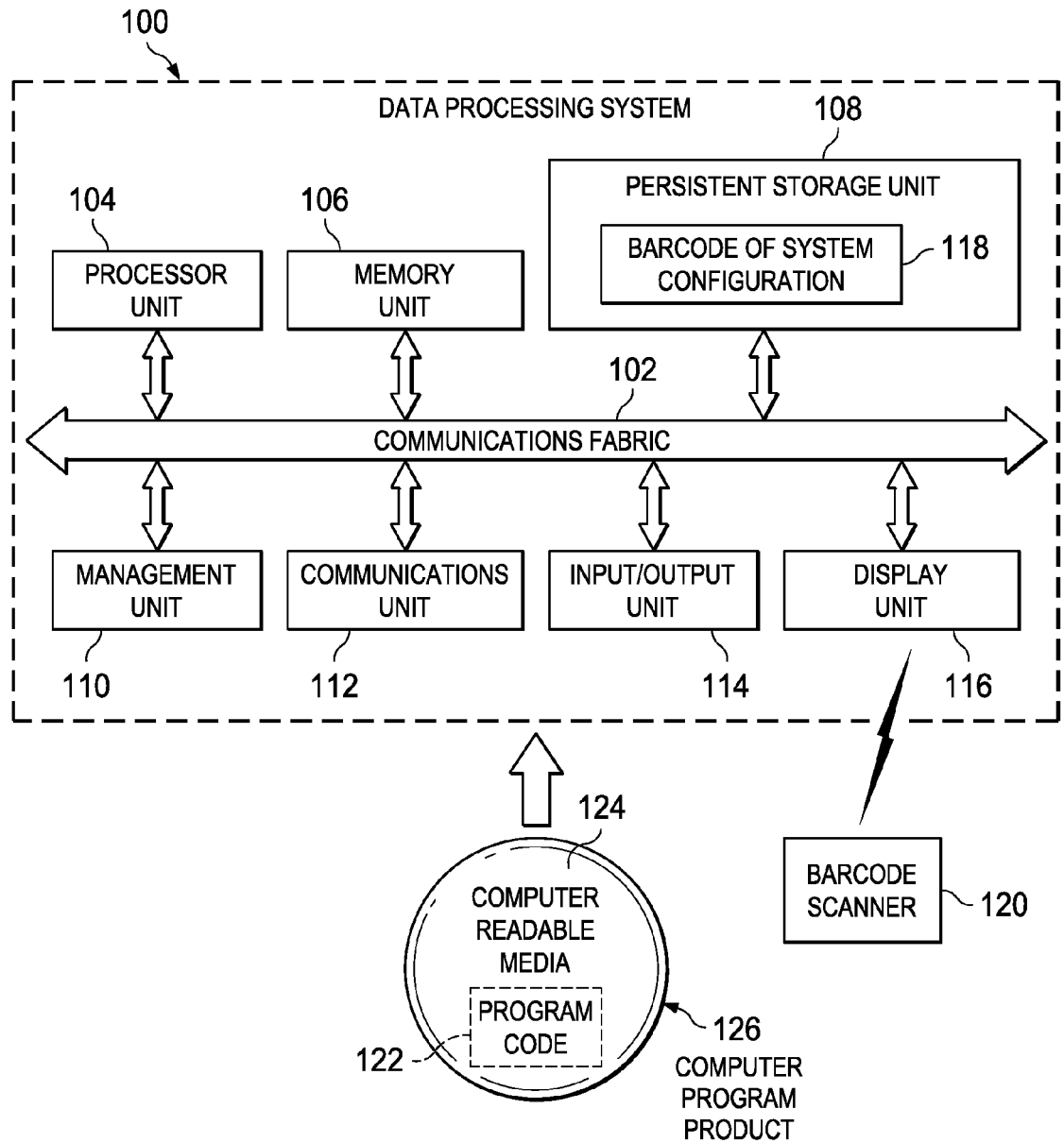
FIG. 1 is a diagram of a data processing system in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to data processing environments in which different illustrative embodiments may be implemented. Many modifications to the depicted environment may be made.

FIG. 1 depicts a diagram of a data processing system in which illustrative embodiments may be implemented. Data processing system 100 may, for example, be a blade server, legacy server, laptop computer, desktop computer, MP3 player, electronic gaming device, personal digital assistant (PDA), or cellular telephone. However, illustrative embodiments are not limited to the preceding list of electronic devices. Data processing system 100 may represent any type of electronic device that includes some type of a display panel.

In this illustrative example, data processing system 100 includes communications fabric 102, which provides communications between processor unit 104, memory unit 106, persistent storage unit 108, management unit 110, communications unit 112, input/output (I/O) unit 114, and display unit 116. Processor unit 104 serves to execute instructions for software that may be loaded into memory unit 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory unit 106, in these examples, may be, for example, a random access memory (RAM). Persistent storage unit 108 may take various forms depending on the particular implementation. For example, persistent storage unit 108 may contain one or more components or devices, such as a hard disk drive, a flash memory, a rewritable optical disk, a rewritable magnetic tape, or some combination of the above. The media used by persistent storage unit 108 also may be removable. For example, a removable hard disk drive may be used for persistent storage unit 108.

Instructions for an operating system and applications or programs are located on persistent storage unit 108. These instructions may be loaded into memory unit 106 for execution by processor unit 104. The processes of different illustrative embodiments may be performed by processor unit 104 using computer implemented instructions, which may be located in a memory, such as memory unit 106. These instructions are referred to as, program code, computer-usable program code, or computer-readable program code that may be read and executed by a processor in processor unit 104. The program code in the different illustrative embodiments may be embodied on different physical or tangible computer readable media, such as memory unit 106 or persistent storage unit 108.

In this illustrative example, persistent storage unit 108 also stores barcode of system configuration 118. However, it should be noted that illustrative embodiments may store barcode of system configuration 118 in memory unit 106 instead of, or in addition to, persistent storage unit 108. Barcode of system configuration 118 is data arranged in the form of a barcode. The barcode may be a two dimensional or a three dimensional barcode. Also, the barcode may, for example, be in a square, cube, rectangular, or any other regular or irregular geometric shape. The data contained within the barcode reflects the current configuration of hardware and software components in data processing system 100. In other words, barcode of system configuration 118 is a barcode representing an inventory of components within data processing system 100.

Two dimensional barcodes and newer barcode technology may store a considerable amount of data. For example, instead of merely storing a serial number for an electronic device, these barcodes may store data regarding components within the electronic device, such as: 1) the number of CPUs a basic input output system (BIOS) can "see" and the speed of the CPUs; 2) firmware levels; 3) the number of dual in-line memory modules (DIMMs) and their respective sizes in MB; 4) the number of hard disk drives and their respective sizes in GB; and 5) operating system levels/information. In other words, illustrative embodiments may incorporate within barcode of system configuration 118 any and all details about the hardware and software components in data processing system 100.

As a result, barcode of system configuration 118 is a dynamic barcode, which is "living and breathing" with the different components in data processing system 100. Therefore, as the hardware and/or software components change in data processing system 100, so does the data contained within barcode of system configuration 118. Consequently, illustrative embodiments make component inventory of data processing system 100 a quick and easy process.

Also, it should be noted that barcode of system configuration 118 may represent a set of two or more barcodes. In other words, the component configuration data for data processing system 100 may be too large for only one barcode to be displayed in display unit 116. Consequently, management unit 110 may generate more than one barcode for the component configuration of data processing system 100 to form the set of barcodes.

Management unit 110 is the component that manages the ecosystem in data processing system 100. In other words, management unit 110 "owns" the entire ecosystem in data processing system 100. Management unit 110 may, for example, be a baseboard management controller (BMC) or other type of management module. Management unit 110 may communicate with all components within data processing system 100 to perform diagnostics for determining component failure. In addition, management unit 110 is responsible for inventorying all the components within data processing system 100, dynamically generating barcode of system configuration 118, storing barcode of system configuration 118 in persistent storage 108, and displaying barcode of system configuration 118 in display unit 116. Management unit 110 may perform these functions automatically when modifications to data processing system 100 occur, when management unit 110 detects component failure, or on a predetermined time interval basis. Alternatively, management unit 110 may perform these functions on demand by a user.

Management unit 110 may be implemented entirely as software, hardware, or as a combination of software and hardware components. Also, management unit 110 may be enabled and disabled independently of other data processing system 100 features and functions. Further, even though management unit 110 is shown locally within data processing system 100, management unit 110 may be located remotely in another data processing system that is coupled to data processing system 100 via communications unit 112.

Communications unit 112, in these examples, provides for communications with other data processing systems or devices. Also, in these examples, communications unit 112 is a network interface card. Communications unit 112 may provide communications through the use of either or both physical and wireless communications links.

Input/output unit 114 allows for input and output of data with other devices that may be connected to data processing system 100. For example, input/output unit 114 may provide a connection for user input through a keyboard and mouse. Further, input/output unit 114 may send output to a printer.

Display unit 116 provides a mechanism to display information, such as barcode of system configuration 118, to the user/operator and/or to barcode scanner 120. Display unit 116 may, for example, be a high-resolution micro display, such as, for example, an organic light-emitting diode (OLED) display device. Alternatively, display unit 116 may be a conventional liquid crystal display (LCD) device. This high-resolution micro display may, for example, be located on a panel of a blade server, on a panel of an MP3 player, or on a panel of any other type of electronic device.

In addition, display unit 116 may include touch screen capabilities. Further, display unit 116 may be of a sub-millimetric measurement in depth. However, it should be noted that illustrative embodiments may utilize any type of display device.

Barcode scanner 120 is a scanner that is capable of wirelessly reading barcodes, such as barcode of system configuration 118, to determine the component configuration of data processing system 100 from the data contained within the scanned barcode. Barcode scanner 120 may, for example, be a portable handheld scanner. Alternatively, barcode scanner 120 may be fixed in one position, such as along a conveyor system in a manufacturing or shipping environment, and coupled to another data processing system.

Program code 122 is located in a functional form on computer readable media 124 and may be loaded onto or transferred to data processing system 100 for execution by processor unit 104. Program code 122 and computer readable media 124 form computer program product 126 in these examples. In one example, computer readable media 124 may be in a tangible form, such as, for example, an optical or magnetic disc that is inserted or placed into a drive or other device that is part of persistent storage unit 108 for transfer onto a storage device, such as a hard drive that is part of persistent storage unit 108. In a tangible form, computer readable media 124 also may take the form of a persistent storage, such as a hard drive or a flash memory that is connected to data processing system 100. The tangible form of computer readable media 118 is also referred to as computer recordable storage media.

Alternatively, program code 122 may be transferred to data processing system 100 from computer readable media 124 through a communications link to communications unit 112 and/or through a connection to input/output unit 114. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different illustrative embodiments may be implemented. The different illustrative embodiments may be implemented in a data processing system including components in addition to, or in place of, those illustrated for data processing system 100. Other components shown in FIG. 1 may be varied from the illustrative examples shown.

For example, a bus system may be used to implement communications fabric 102 and may comprise one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory unit 106 or a cache, such as found in an interface and memory controller hub, which may be present in communications fabric 102.

Illustrative embodiments provide a computer implemented method, system, and computer usable program code for dynamically updating barcode data that reflects a current component configuration of an electronic device when the configuration of the electronic device changes due to component modification or failure. In general, the electronic device needs to be up and running to get the full benefit of processes of illustrative embodiments. However, electronic devices that are powered off may provide the most recently stored "snapshot" of the device's component configuration by using, for example, an auxiliary power source, such as a battery, at a minimum. If an electronic device is powered off with no readily available line power, illustrative embodiments require a charged auxiliary power source for the electronic device. In this powered off state, illustrative embodiments may only display the barcode of the system configuration. In addition, in an auxiliary power mode the electronic device may not be able to collect information about its components to update the barcode. As a result, the barcode may not accurately reflect the actual current configuration of the electronic device, but only a stored snapshot of the device's component configuration.

The electronic device may contain a "switch" of some sort for the user/operator to temporarily engage. For example, the user may push and hold down a hard button on the electronic device. The barcode will then display until the operator releases the hard button or until the auxiliary power runs out. In other examples, the user may move and release a spring loaded slider button or touch a touch screen enabled high-resolution display to display the barcode. The barcode may, for example, be displayed for 30 seconds or until the auxiliary power runs out.

Also, it should be noted that an electronic device may contain a set of two or more barcodes to reflect the device's component configuration. If the electronic device does contain a set of two or more barcodes to reflect the component configuration, then the electronic device will indicate on the display how many barcodes are stored. Alternatively, data obtained by the scanner from the barcode will indicate how many barcodes are used to reflect the electronic device's component configuration.

In either case, the display or the scanner may, for example, indicate "barcode 2 of 4." This set of barcodes may, for example, be manually advanced by the operator engaging the switch described above. Alternatively, the set of barcodes may automatically advance. For example, after every 30 seconds the next barcode is displayed.

In the automatic advance scenario, illustrative embodiments may utilize a non-industry standard display and capture process. This non-industry standard display and capture process may store a barcode timing cycle in the barcodes, themselves. A barcode timing cycle is the length of time a barcode in a set of barcodes is to be displayed in the display unit. A barcode scanner may read this barcode timing cycle and then automatically capture the barcodes as they automatically advance in the display. An amber light on the barcode scanner may, for example, indicate to the operator to hold the scanner steady while barcode scanning is in progress. A green light on the barcode scanner may, for example, indicate to the operator that all barcodes have been scanned.

When the electronic device displays the barcode in its display, the operator may scan the barcode with the barcode scanner. The barcode scanner is intelligent enough to capture all the barcodes, even if the barcode scanner did not start with barcode #1 in the set of barcodes. For example, the barcode scanner may start on barcode #2 of 4 total barcodes, scan barcode #s 2, 3, 4, and 1, and then turn on the green light to indicate that all barcodes in the set have been scanned.

If the electronic device is powered on with connected line power, the electronic device may power up all the necessary hardware and software components for inventory, without the auxiliary power constraints discussed above. For example, high amperage power components and fans may not be able to turn on with a cost effective auxiliary power solution. This is assuming that these high amperage power components and fans need to power on and go through a power on self test before these components report inventory data to a management unit.

As the electronic device powers on, components within the device may turn on, go through power on self testing if necessary, and report inventory or configuration data to the management unit. This power on self testing and inventory data report reporting holds true for components hot swapped in or out of, for example, a server space. Additionally, if the management unit cannot communicate with a component in a reasonable amount of time, the management unit may determine that the component has failed or has other problems and may remove the component's inventory data from the barcode. Further, the management unit may require that components periodically come out of a sleep or offline mode for inventory capture purposes.

Subsequent to the management unit collecting hardware and software component configuration data after electronic device power up, or after a certain timeout, or after components are hot swapped in or out of the electronic device, or if components fail or fall out of communication with the management unit, the management unit compares this component configuration data to previously stored configuration data, if any. If a mismatch exits between the current configuration data and the stored configuration data, the management unit generates an updated barcode or barcodes for display in the electronic device's high information display unit. The management unit may generate multiple barcodes for an electronic device's component configuration if all the configuration data cannot "fit" into a single barcode or if a single barcode containing all of the component configuration data for an electronic device cannot be displayed at one time in the display unit. Alternatively, the management unit may generate a new barcode for the electronic device's component configuration at every power on or once every hour regardless of the previously stored configuration data.

The management unit may then store this barcode image in volatile and/or nonvolatile memory for an operator to call up while the electronic device is in a primary power source mode or an auxiliary power source mode. For example, the barcode or set of barcodes for the electronic device's component configuration may be displayed in an auxiliary power source mode when the operator manually engages a switch or button on the electronic device. In another example, when the electronic device is in a primary power source mode, the operator may navigate the high information display unit to a "display configuration barcode" menu item. By the operator selecting this display configuration barcode menu item, the barcode of the device's component configuration is displayed in the high information display unit. The management unit may, for example, display the barcode or each barcode in the set of barcodes for 30 seconds, then remove the barcodes from the display unit to allow normal operating content to appear in the display unit once again. In another example, the management unit in a blade server chassis, which includes a plurality of blade servers, may process an operator request to display barcodes on all blade servers in the ecosystem.

Figure 2:
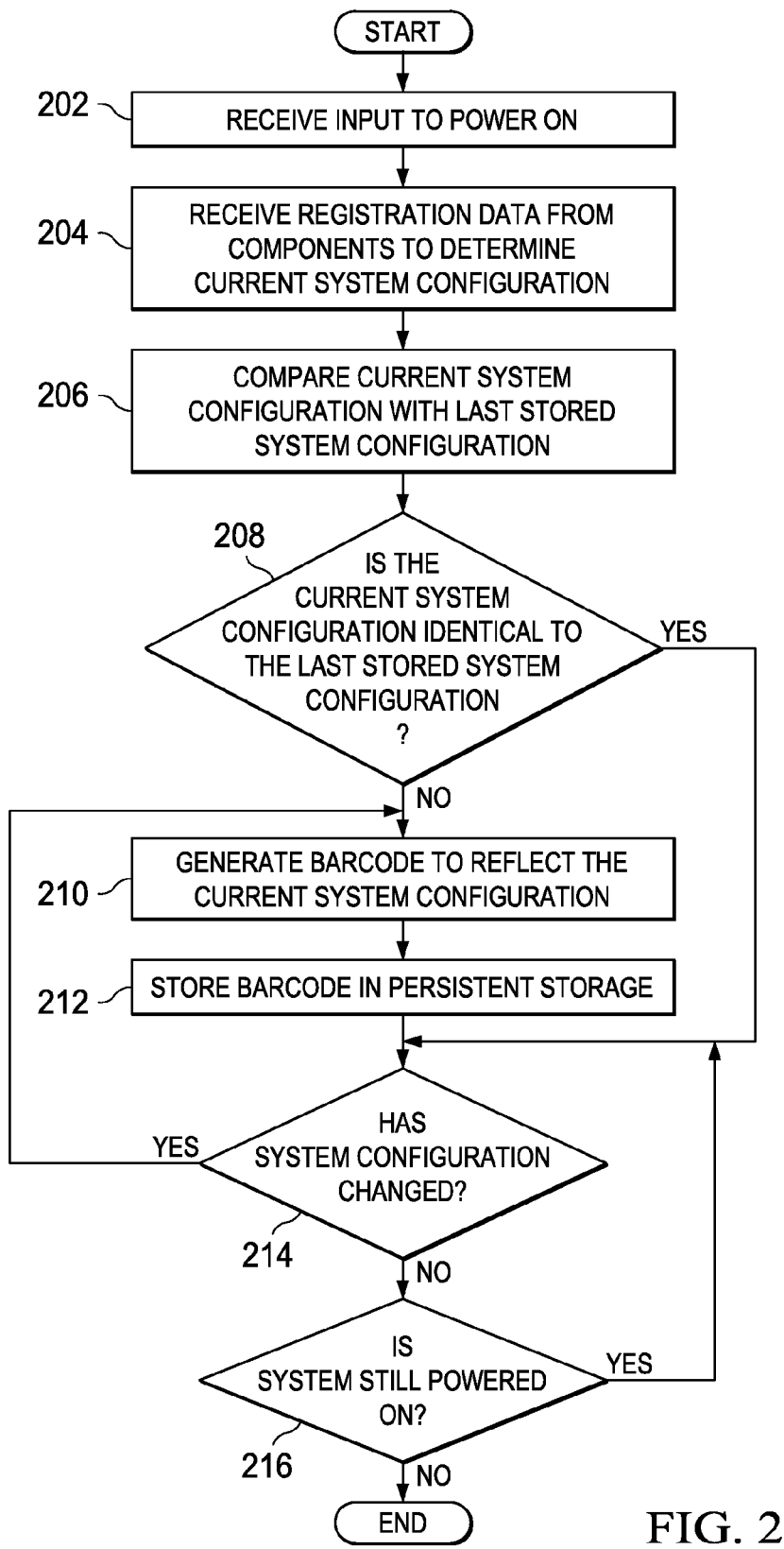
FIG. 2 is a flowchart illustrating an exemplary process for dynamically updating system configuration barcodes in accordance with an illustrative embodiment.

With reference now to FIG. 2, a flowchart illustrating an exemplary process for dynamically updating system configuration barcodes is shown in accordance with an illustrative embodiment. The process shown in FIG. 2 may be implemented in a management unit, such as management unit 112 in FIG. 1.

The process begins when a data processing system, such as data processing system 100 in FIG. 1 receives an input to power on (step 202). The input to power on may be a manual input by a user or may be an automatic input from an application or another data processing system. Powering on may, for example, include a notebook computer powering on under main battery power or a server device connecting to line power.

After receiving the input to power on in step 202, the data processing system utilizes the management unit to receive registration data from components within the data processing system to determine a current system configuration (step 204). The components may, for example, be hardware components, software components, or a combination of software and hardware components. Then, the management unit compares the current system configuration with the last stored system configuration (step 206).

Subsequent to comparing the current system configuration with the last stored system configuration in step 206, the management unit makes a determination as to whether the current system configuration is identical to the last stored system configuration (step 208). If the current system configuration is not identical to the last stored system configuration, no output of step 208, then the management unit generates a barcode to reflect the current system configuration, such as barcode of system configuration 118 in FIG. 1 (step 210). Then, the management unit stores the barcode in a persistent storage, such as persistent storage unit 108 in FIG. 1 (step 212). Thereafter, the process proceeds to step 214.

Returning again to step 208, if the current system configuration is identical to the last stored system configuration, yes output of step 208, then the management unit makes a determination as to whether the system configuration has changed (step 214). If the system configuration has changed, yes output of step 214, then the process returns to step 210 where the management unit generates a barcode to reflect the current system configuration. The system configuration may, for example, change when a component fails or stops communicating with the management unit, when a user hot swaps one or more components in or out of the system, or when a user adds or removes one or more components when the system is down. As a result of these changes, the management unit may automatically generate the new barcode for the new system configuration at power on or at event occurrence. Alternatively, the management unit may make this system configuration change determination on a predetermined time interval basis, such as, for example, once every 30 seconds, minute, 15 minutes, 30 minutes, hour, 6 hours, 12 hours, day, or week. However, it should be noted that illustrative embodiments may use any time interval basis.

If the system configuration has not changed, no output of step 214, then the management unit makes a determination as to whether the data processing system is still powered on (step 216). If the data processing system is still powered on, yes output of step 216, then the process returns to step 214 where the management unit determines whether the system configuration has changed. If the data processing system is not still powered on, no output of step 216, then the process terminates thereafter.

Figure 3:
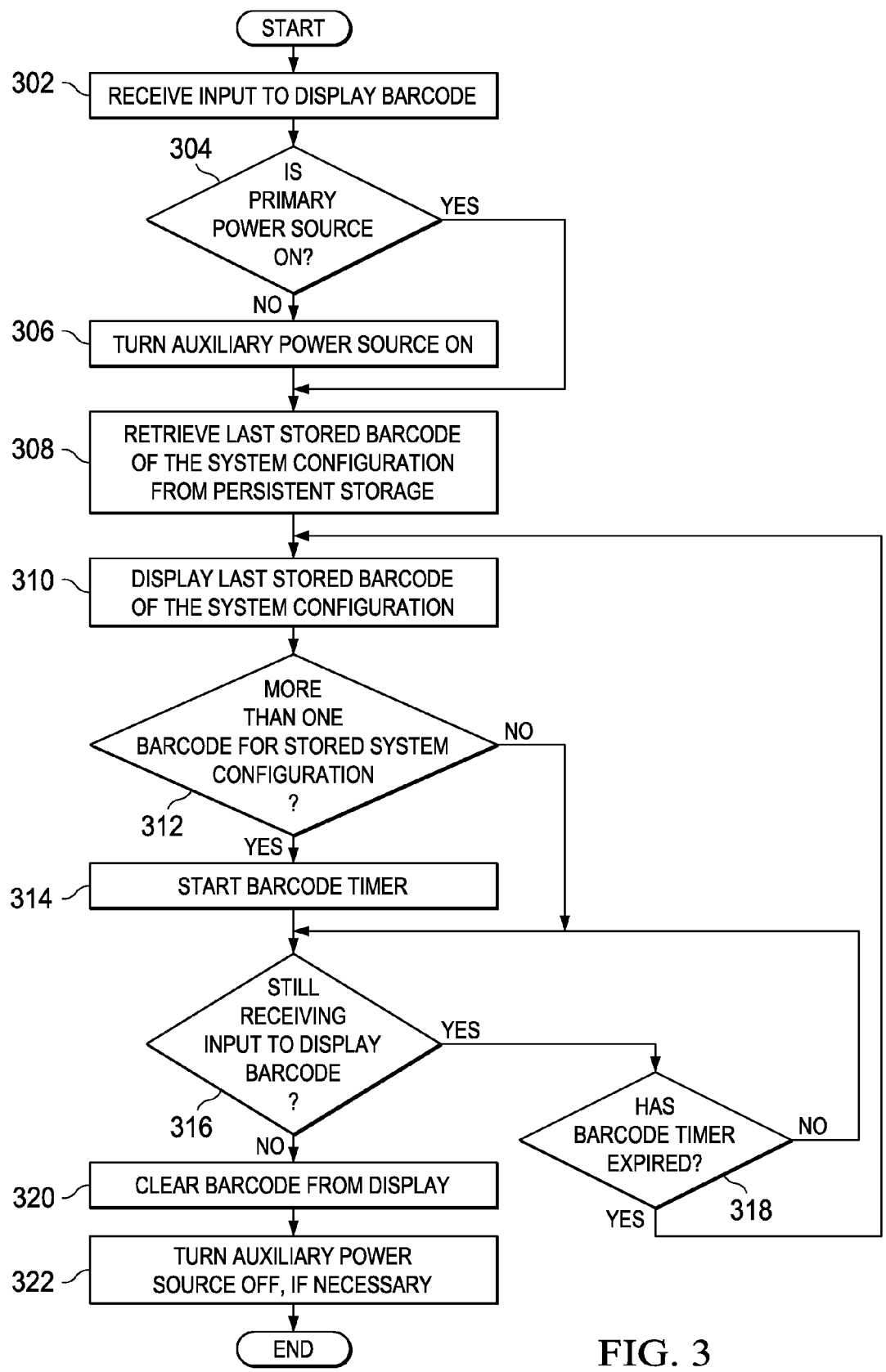
FIG. 3 is a flowchart illustrating an exemplary process for viewing system configuration barcodes in accordance with an illustrative embodiment.

With reference now to FIG. 3, a flowchart illustrating an exemplary process for viewing system configuration barcodes is shown in accordance with an illustrative embodiment. The process shown in FIG. 3 may be implemented in a management unit, such as management unit 112 in FIG. 1.

The process begins when the management unit receives an input to display a barcode of a system configuration for a data processing system, such as, for example, barcode of system configuration 118 for data processing system 100 in FIG. 1 (step 302). The input to display the barcode of the system configuration may, for example, be received from an individual, such as a system administrator or operator of the data processing system, pressing and holding a physical button located on the data processing system. Subsequent to the management unit receiving the input to display the barcode of the system configuration in step 302, the management unit makes a determination as to whether a primary power source for the data processing system is on (step 304). If the primary power source is on, yes output of step 304, then the process proceeds to step 308. The primary power source may, for example, be a main battery for a portable electronic device, such as a laptop computer, or a line power source for a server device. If the primary power source is not on, no output of step 304, then the management unit turns an auxiliary power source on (step 306).

Then, the management unit retrieves the last stored barcode of the system configuration from a persistent storage, such as, for example, persistent storage unit 108 in FIG. 1 (step 308). Then, the management unit displays the last stored barcode of the system configuration in a display, such as, for example, display unit 118 in FIG. 1 (step 310). Afterward, the management unit makes a determination as to whether more than one barcode is used to reflect the system configuration (step 312).

If more than one barcode is not used for the system configuration, no output of step 312, then the process proceeds to step 316. If more than one barcode is used for the system configuration, yes output of step 312, then the management unit starts a barcode timer (step 314). The length of time the bar code timer is set for may be a default value, such as, for example, 30 seconds. Alternatively, the barcode timer may be set by a user, such as, for example, the system administrator.

Then, the management unit makes a determination as to whether the management unit is still receiving the input to display the barcode of the system configuration (step 316). If the management unit is still receiving the input to display the barcode, yes output of step 316, then the management unit makes a determination as to whether the barcode timer has expired (step 318). If the barcode timer has expired, yes output of step 318, then the process returns to step 310 where the management unit displays the next barcode in the set of barcode for the system configuration. If the barcode timer has not expired, no output of step 318, then the process returns to step 316 where the management unit determines if the input to display the barcode is still being received.

Returning again to step 316, if the management unit is not still receiving the input to display the barcode, no output of step 316, then the management unit clears the barcode of the system configuration from the display unit (step 320). Then, if necessary, the management unit turns the auxiliary power source off (step 322). The process terminates thereafter.

Thus, illustrative embodiments of the present invention provide a computer implemented method, system, and computer program product for dynamically updating barcode data that reflects a current component configuration of the data processing system when the configuration of the data processing system changes. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardwarebased systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating a barcode, the computer implemented method comprising:
   responsive to receiving registration data from at least one component in a data processing system to determine a current component configuration of the data processing system, comparing the current component configuration of the data processing system with a last stored component configuration for the data processing system;
   determining whether the current component configuration of the data processing system matches the last stored component configuration for the data processing system;
   responsive to determining that the current component configuration of the data processing system does not match the last stored component configuration for the data processing system, generating a barcode that reflects the current component configuration of the data processing system;
   storing the barcode that reflects the current component configuration of the data processing system in a storage device;
   responsive to determining that the current component configuration of the data processing system does match the last stored component configuration for the data processing system, determining whether a component configuration in the data processing system changed; and
   responsive to determining that the component configuration in the data processing system has changed, generating a new barcode to reflect a change in the component configuration in the data processing system.

2. The computer implemented method of claim 1, further comprising:
   responsive to receiving an input to display a last stored barcode containing the component configuration for the data processing system, determining whether a primary power source is on for the data processing system;
   responsive to determining that the primary power source is on for the data processing system, retrieving the last stored barcode containing the component configuration for the data processing system from the storage device; and
   displaying the last stored barcode containing the component configuration for the data processing system within a display unit.

3. The computer implemented method of claim 2, further comprising:
   responsive to determining that the primary power source is not on for the data processing system, turning an auxiliary power source on for the data processing system to display the last stored barcode containing the component configuration for the data processing system within the display unit.

4. The computer implemented method of claim 2, further comprising:
determining whether the last stored barcode containing the component configuration for the data processing system is a set of barcodes;
responsive to determining that the last stored barcode containing the component configuration for the data processing system is a set of barcodes, starting a barcode timer; and
responsive to determining that the barcode timer has expired, displaying a next barcode within the set of barcodes in the display unit.

5. The computer implemented method of claim 4, wherein the set of barcodes includes a barcode timing cycle.

6. The computer implemented method of claim 5, wherein the barcode timing cycle is a length of time each barcode within the set of barcodes is displayed in the display unit.

7. The computer implemented method of claim 2, wherein the barcode is displayed within the display unit for an operator to scan using a barcode scanner, and wherein the barcode scanner reads data contained within the barcode.

8. The computer implemented method of claim 1, wherein data contained within the barcode reflects a hardware component configuration and a software component configuration within the data processing system.

9. The computer implemented method of claim 1, wherein the barcode is one of a two dimensional barcode or a three dimensional barcode.

10. A data processing system for generating a barcode, comprising:
a bus system;
a storage device connected to the bus system, wherein the storage device stores a set of instructions; and
a processing unit connected to the bus system, wherein the processing unit executes the set of instructions to compare a current component configuration of the data processing system with a last stored component configuration for the data processing system in response to receiving registration data from at least one component in the data processing system to determine the current component configuration of the data processing system; determine whether the current component configuration of the data processing system matches the last stored component configuration for the data processing system; generate a barcode that reflects the current component configuration of the data processing system in response to determining that the current component configuration of the data processing system does not match the last stored component configuration for the data processing system; store the barcode that reflects the current component configuration of the data processing system in the storage device; determine whether a component configuration in the data processing system changed in response to determining that the current component configuration of the data processing system does match the last stored component configuration for the data processing system; and generate a new barcode to reflect a change in the component configuration in the data processing system in response to determining that the component configuration in the data processing system has changed.

11. The data processing system of claim 10, wherein the processing unit executes a further set of instructions to determine whether a primary power source is on for the data processing system in response to receiving an input to display a last stored barcode containing the component configuration for the data processing system; retrieve the last stored barcode containing the component configuration for the data processing system from the storage device in response to determining that the primary power source is on for the data processing system; and display the last stored barcode containing the component configuration for the data processing system within a display unit.

12. The data processing system of claim 11, wherein the processing unit executes a still further set of instructions to turn an auxiliary power source on for the data processing system to display the last stored barcode containing the component configuration for the data processing system within the display unit in response to determining that the primary power source is not on for the data processing system.

13. The data processing system of claim 11, wherein the processing unit executes a still further set of instructions to determine whether the last stored barcode containing the component configuration for the data processing system is a set of barcodes; start a barcode timer in response to determining that the last stored barcode containing the component configuration for the data processing system is a set of barcodes; and display a next barcode within the set of barcodes in the display unit in response to determining that the barcode timer has expired.

14. The data processing system of claim 13, wherein the set of barcodes includes a barcode timing cycle.

15. A computer program product comprising a computer readable storage device storing computer usable program code therein that is executable by a computer for generating a barcode, the computer program product comprising:
computer usable program code for comparing a current component configuration of a data processing system with a last stored component configuration for the data processing system in response to receiving registration data from at least one component in the data processing system to determine the current component configuration of the data processing system;
computer usable program code for determining whether the current component configuration of the data processing system matches the last stored component configuration for the data processing system;
computer usable program code for generating a barcode that reflects the current component configuration of the data processing system in response to determining that the current component configuration of the data processing system does not match the last stored component configuration for the data processing system;
computer usable program code for storing the barcode that reflects the current component configuration of the data processing system in a storage device;
computer usable program code for determining whether a component configuration in the data processing system changed in response to determining that the current component configuration of the data processing system does match the last stored component configuration for the data processing system; and
computer usable program code for generating a new barcode to reflect a change in the component configuration in the data processing system in response to determining that the component configuration in the data processing system has changed.

16. The computer program product of claim 15, further comprising:

computer usable program code for determining whether a primary power source is on for the data processing system in response to receiving an input to display a last stored barcode containing the component configuration for the data processing system;

computer usable program code for retrieving the last stored barcode containing the component configuration for the data processing system from the storage device in response to determining that the primary power source is on for the data processing system; and computer usable program code for displaying the last stored barcode containing the component configuration for the data processing system within a display unit.

17. The computer program product of claim 16, further comprising:

computer usable program code for turning an auxiliary power source on for the data processing system to display the last stored barcode containing the component configuration for the data processing system within the display unit in response to determining that the primary power source is not on for the data processing system.

18. The computer program product of claim 16, further comprising:

computer usable program code for determining whether the last stored barcode containing the component configuration for the data processing system is a set of barcodes;

computer usable program code for starting a barcode timer in response to determining that the last stored barcode containing the component configuration for the data processing system is a set of barcodes; and computer usable program code for displaying a next barcode within the set of barcodes in the display unit in response to determining that the barcode timer has expired.

19. The computer program product of claim 18, wherein the set of barcodes includes a barcode timing cycle.

20. The computer program product of claim 19, wherein the barcode timing cycle is a length of time each barcode within the set of barcodes is displayed in the display unit.

* * * * *